Jan. 9, 1934.  E. GRAF  1,942,643

VENT PLUG FOR STORAGE BATTERIES

Filed June 11, 1931

WITNESS:
Rob't R. Kitchel.

INVENTOR
Ernest Graf
BY
Augustus B. Stoughton
ATTORNEY.

Patented Jan. 9, 1934

1,942,643

UNITED STATES PATENT OFFICE 1,942,643

VENT PLUG FOR STORAGE BATTERIES

Ernest Graf, Philadelphia, Pa., assignor to The Electric Storage Battery Company, Philadelphia, Pa., a corporation of New Jersey Application June 11, 1931. Serial No. 543,608

2 Claims. (Cl. 136—178)

The subject of my invention is a vent plug for electric storage batteries having a gravity actuated valve which closes the vent opening through the vent plug when the storage battery is tipped.

My novel vent plug has a chamber therein, an outlet vent to said chamber, a cell vent from the cell to said chamber, a baffle between said cell vent and said outlet vent, a drain from said chamber to said cell, a valve controlling said cell vent and said drain, and a weight pivoted about said valve to close it when the battery is tilted.

For a further exposition of my invention reference may be had to the annexed drawing and specification at the end whereof my invention will be specifically pointed out and claimed.

Figure 4:
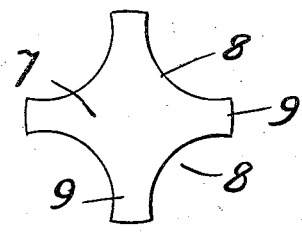
Figure 4 is a plan view of an element.
Figure 3:
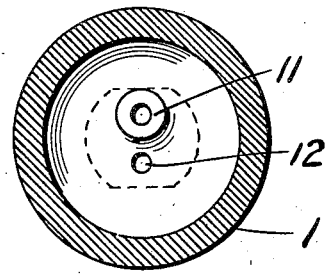
Figure 3 is a horizontal cross section through my device.
Figure 1:
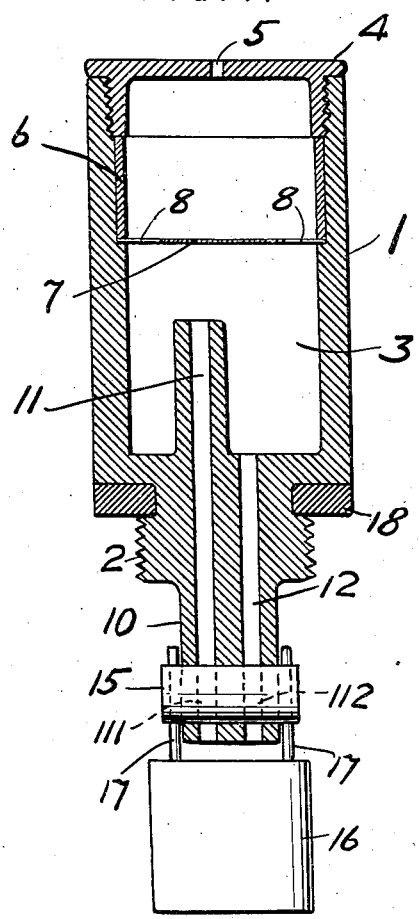
Figure 1 is a vertical cross section of my device with the valve and weight shown in elevation.
Figure 2:
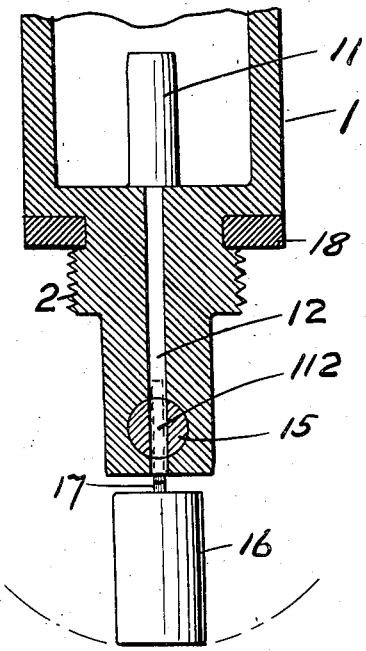
Figure 2 is a vertical cross section at right angles to Figure 1 with the weight shown in elevation.

I have illustrated in the drawing an embodiment of my invention consisting of a vent plug generally indicated at 1. This vent plug has at its lower end screw threads 2 or other convenient means for attaching the vent plug to a storage battery. In its interior vent plug 1 has a chamber 3 of sufficient capacity to retain a small amount of electrolyte therein in case such electrolyte is spilled from the cell before the valve, which is intended to prevent such spilling, operates. The spilled electrolyte is retained in the chamber 3 and when the storage battery returns to normal position the electrolyte flows back to the cell. At the upper end of chamber 3 vent plug 1 is provided with a cap 4 which is attached thereto by screw threads or other means and which carries an outlet vent 5 therein. This outlet vent 5 may, if desired, project down into cavity 3 so as to be spaced from the top wall of cap 4 and to provide a more tortuous passage to prevent the outlet of any electrolyte trapped in chamber 3. This construction is not shown in the drawing but will be readily understood. Cap 4 retains in chamber 3 a ring shaped member 6 which in turn holds in place a baffle 7. This baffle is of cruciformed or other many pointed shape, as is best seen in Figure 4, having openings 8 between the arms 9 thereof.

At its lower or inner end vent plug 1 is provided with a neck 10 through which runs a cell vent 11 which projects above the bottom of chamber 3. Neck 10 also contains drain 12 which leads from the bottom of a chamber 3. Cell vent 11 and drain 12 are controlled by valve 15 which has holes 111 and 112 in it respectively in alinement with cell vent 11 and drain 12 when the storage battery is in normal position. Connected to valve 15 is a weight 16 of lead or other suitable heavy acid resistant material. Weight 16 is connected to valve 15 by means of bars 17 so that weight 16 causes the valve to pivot about its axis.

Vent plug 1 may, if desired, be provided with a gasket 18 for forming a gas-tight closure when the vent plug is in position in the filling opening.

In operation the vent plug 1 and the parts suspended thereon are simply screwed into the filling opening of a storage battery cell which is not illustrated. In normal position the weight 16 depends from valve 15 and holds holes 111 and 112 respectively in alinement with cell vent 11 and drain 12. The bottom of neck 10 terminates above the normal level of the electrolyte so that gas evolved in the cell escapes through cell vent 11 into chamber 3 where it is baffled about baffle 7 and escapes to the atmosphere through the outlet vent 5. Should the storage battery be tipped or tilted so that there is danger of the electrolyte escaping through cell vent 11 and drain 12 weight 16 causes valve 15 to close cell vent 11 and drain 12. This occurs whether the battery is tipped about the axis of valve 15 or about some other axis as such tipping is accompanied with sufficient jarring to cause the valve 15 to pivot. Upon return of the battery to normal position weight 16 again turns valve 15 and opens cell vent 11 and drain 12 so that any electrolyte which has escaped from the cell into chamber 3 returns to the cell through drain 12.

I do not intend to be limited in the practice of my invention save as the scope of the prior art and of the attached claims may require.

I claim:

1. A vent plug for storage batteries having a chamber therein, an outlet vent from said chamber, a cell vent leading to said chamber and entering it above the bottom thereof, a baffle in said chamber between said outlet vent and said cell vent, a drain from said chamber, a valve of rigid material controlling said cell vent and said drain, and a weight mounted on said valve and movable with said valve pivotally to actuate it by gravity.

2. A vent plug for storage batteries having a chamber therein, an outlet vent from said chamber, a cell vent leading to said chamber and entering it above the bottom thereof, a drain from the bottom of said chamber, a baffle in said chamber between said outlet vent and said cell vent, a valve cylindrical in shape having openings therein in alinement with said cell vent and with said drain, and a weight connected to said valve to turn it pivotally by gravity to move the openings in the valve out of alinement with said cell vent and with said drain respectively.

ERNEST GRAF.